Aug. 23, 1932.    J. G. MOXEY    1,873,624
MEASURING AND DISPENSING DEVICE
Filed Jan. 26, 1932
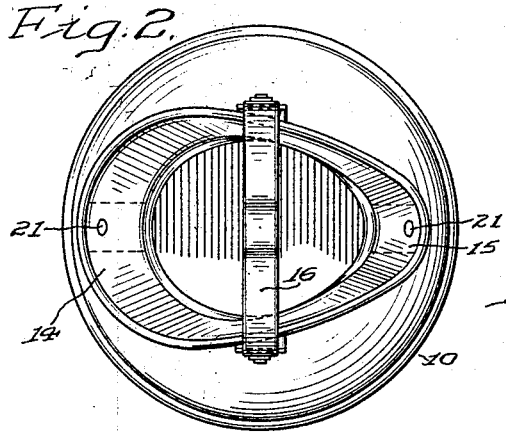
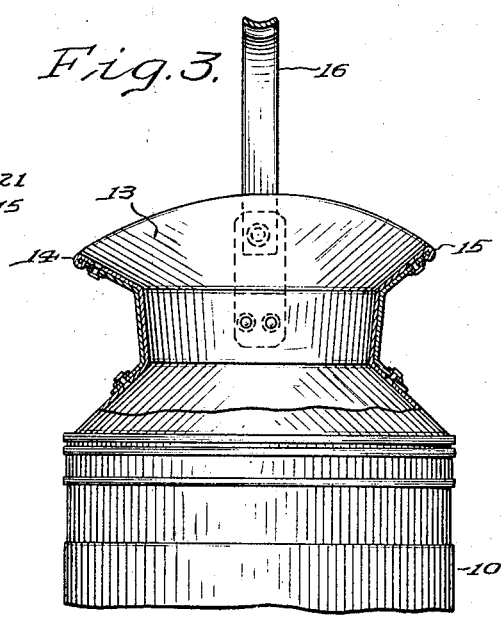
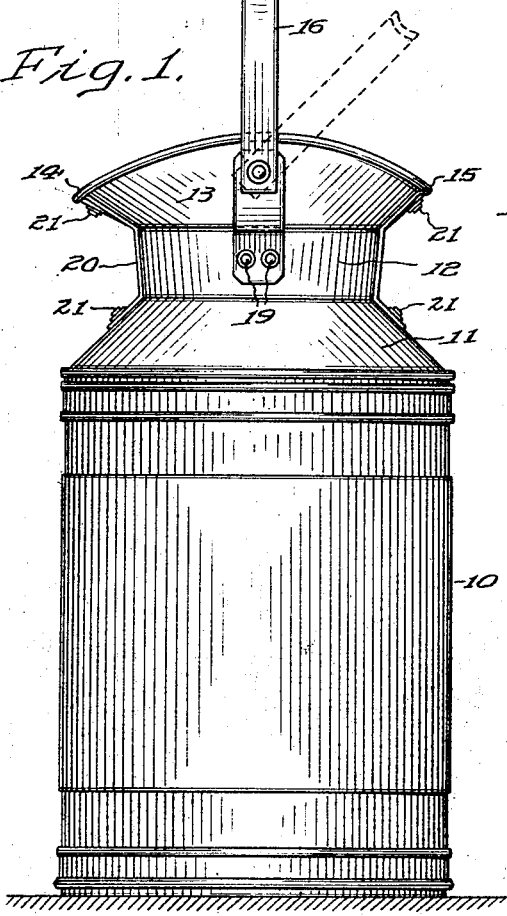
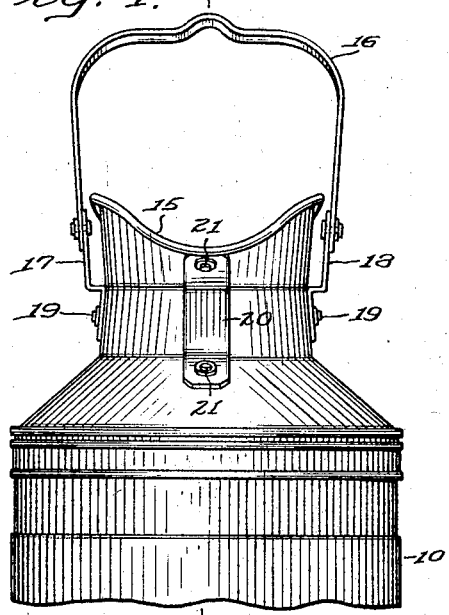
INVENTOR
John G. Moxey.
BY John D. Myers
ATTORNEY
WITNESS
F. J. Hartman.

Patented Aug. 23, 1932

1,873,624

UNITED STATES PATENT OFFICE

JOHN G. MOXEY, OF PHILADELPHIA, PENNSYLVANIA

MEASURING AND DISPENSING DEVICE

Application filed January 26, 1932. Serial No. 588,896.

This invention relates to measuring and dispensing devices, and in particular it relates to a dispensing receptacle designed to be employed for liquids having different flowing properties.

In measuring and dispensing such liquids as gasoline, kerosene and lubricating oil from the trucks or other vehicles ordinarily used in transporting the same, it is customary to provide such trucks or other vehicles with measuring or dispensing receptacles by which the different products transported by the trucks may be measured and transferred from the truck or other similar vehicle to appropriate containers located at the service or other stations. The measuring and dispensing devices heretofore supplied for this purpose have been provided with an opening at the top having a single pouring lip from which the contents of the receptacle, after it has been filled from the tank, may be transferred to appropriate containers provided for such products at service stations, garages and other places.
Although the flowing properties of the various products transported in this manner differ to a considerable degree, the usual practice heretofore has been to provide the trucks with measuring and dispensing receptacles each of which is provided with a single pouring lip, and this lip has not been designed with any particular reference to the product to be dispensed thereby.

As heretofore utilized, measuring and dispensing devices of this general character have been employed for transferring the various products, such as gasoline, kerosene and lubricating oil, to containers having openings differing in size, so that it has been difficult to utilize a standard measuring and dispensing device provided with a single pouring lip to transfer the products from the tank to the various containers.

In order to overcome the difficulties heretofore encountered, I have devised a measuring and dispensing receptacle which may be utilized with products having different flowing properties, such as gasoline and lubricating oil. I have also devised a receptacle which may readily be employed in pouring the contents thereof into containers provided with openings differing in size.

In order that my invention may be understood, reference may be made to the accompanying drawing wherein:

Fig. 1 is a view in side elevation of a dispensing device in which my invention is embodied;

Fig. 2 is a plan view of the same;

Fig. 3 is a partial sectional view of my device taken on the line 3—3 of Fig. 4; and Fig. 4 is a partial elevation at right angles to the view shown in Fig. 1.

I have shown my invention as applied to a measuring and dispensing receptacle 10 ordinarily designed to hold a standard quantity of liquid, such as gasoline, kerosene or lubricating oil. This receptacle is preferably of cylindrical form, and is provided with an inwardly tapering wall 11 at its upper end upon which a neck portion 12 is secured. In the preferred form of my invention, the neck portion 12 has secured thereon an outwardly flaring pouring flange 13. This pouring flange is so formed as to provide oppositely disposed pouring lips 14 and 15.

As clearly shown in Fig. 2 of the drawing, the oppositely arranged pouring lips are so constructed that they have different degrees of curvature in order that liquids having different flowing properties may readily be transferred from the receptacle to another container. Preferably the pouring lip 14 is so formed as to have a small degree of curvature, and this lip is designed particularly to be used in measuring and dispensing limpid liquids such as gasoline and kerosene, and will ordinarily be employed when the contents of my dispensing device are to be transferred to a container provided with a relatively large opening for the reception of the same. The curvature of the oppositely disposed lip 15 is substantially greater, and this lip is primarily designed for transferring products of a viscous nature, such as lubricating oils. The shape of the lip 15 is also such that it is adapted to be used in transferring the contents of the receptacle to a container provided with a comparatively small opening.

In order that the dispensing device to which my invention is applied may be readily carried from the truck or other vehicle, I have provided the same with a bail 16 having the ends thereof pivoted substantially in the plane of the pouring lips. Preferably, I pivot the ends of the bail to the upper ends of a pair of ears 17, 18, the lower ends of which are riveted or otherwise secured in some suitable manner to the neck portion of the receptacle as shown at 19. By thus pivoting the bail 16 substantially in the plane of the pouring lips, the bail is movable to and from each pouring lip and is located in such proximity to the pouring lips as to permit either of the pouring lips to be guided easily toward the opening into which the contents of my dispensing receptacle is to be transferred.

For the purpose of strengthening and supporting the pouring lips, I have provided the reinforcing members 20 bent to conform to the outer surface of the inwardly tapering wall 11, the neck portion 12 and the outwardly flared pouring flange 13. These reinforcing members may be secured to the receptacle in any suitable manner, such as by rivets 21, by soldering or otherwise.

It will thus be seen that I have provided a measuring and dispensing receptacle which may readily be used for transferring liquids having different flowing properties from a truck or other vehicle to appropriate containers for the same, and that a single measuring and dispensing receptacle having my improved pouring lips thereon may be utilized for measuring and transferring gasoline, kerosene and lubricating oil to containers therefor without the inconvenience heretofore experienced in measuring and transferring such products and pouring the same from a measuring and dispensing device having only one pouring lip. It will also be seen that my improvement provides a device by means of which the contents of a measuring and dispensing receptacle may be transferred to containers having either large or comparatively small openings, without the inconveniences inherent in devices heretofore used. While I have shown and described a preferred form of my improvement, it will be understood that various changes may be made therein without departing from my invention as set out in the claims appended hereto.

Having thus described my invention, what I desire to secure by Letters Patent is:

1. In a dispensing receptacle for liquids, a body portion having an opening in the top thereof, a pouring flange surrounding said opening, pouring lips of substantially different degrees of curvature oppositely disposed on said pouring flange, and a bail pivoted to said receptacle for movement to and from said lips.

2. In a dispensing receptacle for liquids, a body portion, a neck secured thereto, a pouring flange secured on the neck and having oppositely disposed pouring lips of substantially different degrees of curvature, and a bail pivotally mounted on said receptacle for movement to and from said lips.

3. In a dispensing receptacle, a body portion, a neck secured thereto, a pouring flange secured on the neck and having oppositely disposed pouring lips, said lips being of substantially different degrees of curvature, and a bail secured to said receptacle and pivoted intermediate said pouring lips for movement to and from each of said lips.

4. In a dispensing receptacle, a body portion having an opening in the upper end thereof provided with oppositely disposed pouring lips, said lips being of substantially different degrees of curvature, ears secured on said receptacle, and a bail pivoted to said ears substantially in the plane of said lips for movement to and from each of said lips.

5. In a dispensing receptacle, a body portion, a neck secured thereon, oppositely disposed pouring lips secured on said neck, a pair of ears secured to said neck intermediate said lips, and a bail pivoted on said ears for movement to and from each of said lips.

6. In a measuring and dispensing device, a body portion having an opening in the top thereof, oppositely disposed pouring lips of substantially different degrees of curvature provided on the edge of said opening, and means secured on said device whereby said device may be carried and either of said lips directed to an opening into which the contents of said device are to be poured.

7. In a measuring and dispensing device, a cylindrical body portion, an inwardly tapered top wall thereon, a neck secured to the tapered top wall, an outwardly tapered flange secured on said neck, and oppositely disposed pouring lips of different degrees of curvature on said outwardly tapered flange.

In testimony whereof I have signed my name to this specification.

JOHN G. MOXEY.